United States Patent
Thomas (10) Patent No.: US 10,358,210 B2
(45) Date of Patent: Jul. 23, 2019

(54) AIRCRAFT ACTUATOR

(71) Applicant: AIRBUS OPERATIONS LIMITED, Bristol (GB)

(72) Inventor: Dilip Thomas, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 340 days.

(21) Appl. No.: 14/969,530

(22) Filed: Dec. 15, 2015

(65) Prior Publication Data

US 2016/0167774 A1 Jun. 16, 2016

(30) Foreign Application Priority Data

Dec. 16, 2014 (GB) .................................. 1422344.0

(51) Int. Cl.
*B64C 25/60* (2006.01)
*F15B 15/14* (2006.01)
*B64C 25/34* (2006.01)

(52) U.S. Cl.
CPC .............. *B64C 25/60* (2013.01); *B64C 25/34* (2013.01); *F15B 15/1404* (2013.01)

(58) Field of Classification Search
CPC .......... B64C 25/02; B64C 25/22; B64C 25/60
See application file for complete search history.

(56) References Cited

U.S. PATENT DOCUMENTS

| | | | |
|---|---|---|---|
| 1,918,699 A * | 7/1933 | Gruss | B64C 25/60 188/317 |
| 3,745,880 A | 7/1973 | Metz et al. | |
| 5,009,068 A | 4/1991 | Clarke | |
| 6,279,854 B1 | 8/2001 | Lindahl | |
| 6,837,343 B1 * | 1/2005 | Bugaj | B60G 21/073 188/304 |
| 2005/0201874 A1 | 9/2005 | Atkinson | |

(Continued)

FOREIGN PATENT DOCUMENTS

| | | |
|---|---|---|
| EP | 1749741 A1 | 2/2007 |
| EP | 2248720 A2 | 11/2010 |

(Continued)

OTHER PUBLICATIONS

European Search Report dated May 31, 2016 EP Application No. 15197595.

(Continued)

*Primary Examiner* — Jessica B Wong
(74) *Attorney, Agent, or Firm* — Nixon & Vanderhye P.C.

(57) ABSTRACT

The invention relates to an actuator. More specifically, but not exclusively, an aircraft pitch damper which comprises an actuator. The actuator comprises a first chamber charged with gas and a second chamber charged with gas. An intermediate chamber containing liquid is located between the first chamber and second chamber. A piston rod extends towards the first chamber through the second chamber and intermediate chamber. A first piston head is associated with and partially defines the first chamber, and a second piston head is associated with and partially defines the second chamber. The piston rod is arranged to abut and move with the first piston head in a first direction, the piston rod further arranged to abut and move with the second piston head in a second direction.

17 Claims, 6 Drawing Sheets

(56) References Cited

U.S. PATENT DOCUMENTS

| | | |
|---|---|---|
| 2009/0050736 A1 | 2/2009 | Bennett et al. |
| 2009/0095585 A1 | 4/2009 | Lassus et al. |
| 2010/0116930 A1 | 5/2010 | Griffin |
| 2013/0119196 A1* | 5/2013 | Lindahl .................. B64C 25/22 244/100 R |
| 2013/0233968 A1 | 9/2013 | Goodburn et al. |

FOREIGN PATENT DOCUMENTS

| | | | |
|---|---|---|---|
| EP | 2664538 A2 | 11/2013 | |
| FR | 1035404 A  * | 8/1953 | ............. B64C 25/22 |
| GB | 2483472 A | 3/2012 | |
| JP | 2008051194 A | 3/2008 | |

OTHER PUBLICATIONS

United Kingdom Search Report dated May 21, 2015 in Great Britain Application No. 1422344.0.

\* cited by examiner

AIRCRAFT ACTUATOR

RELATED APPLICATIONS

The present application claims priority from Great Britain Application No. 1422344.0, filed Dec. 16, 2014, the disclosure of which is hereby incorporated by reference herein in its entirety.

BACKGROUND OF THE INVENTION

The present invention relates to an actuator. More particularly, but not exclusively, the invention concerns an actuator for use as a pitch damper in an aircraft landing gear.

An aircraft landing gear may include pitch dampers which bias the pitch of a landing gear bogie when the aircraft is flying and the landing gear is down, and/or when the landing gear is stored in the landing gear bay. The pitch of the bogie may be such that in a multi-wheel bogie the front wheels are higher than the rear wheels, or such that the front wheels are lower than the rear wheels. Typically, such pitch dampers are part of the aircraft hydraulics system, the hydraulic system being arranged to control the pitch damper to bias the bogie appropriately.

Alternatively, pitch dampers may be independent of the aircraft hydraulics system. These pitch dampers are held in a biased position by a combination of oil and gas within the pitch damper. Any leakage of oil from the hydraulics system and/or pitch damper will affect the functioning of the pitch damper, and a small leakage may have a significant effect on the performance of the pitch damper. This leads to regular inspection of the oil level and pressure within the pitch damper, and potentially maintenance of the pitch damper, being required in order to keep the performance within acceptable parameters.

The present invention seeks to mitigate the above-mentioned problems. Alternatively or additionally, the present invention seeks to provide an improved actuator.

SUMMARY OF THE INVENTION

The present invention provides, according to a first aspect, an actuator comprising a first chamber charged with gas, a second chamber charged with gas, and an intermediate chamber containing liquid, the intermediate chamber located between the first chamber and second chamber, a piston rod extending towards the first chamber through the second chamber and intermediate chamber, a first piston head associated with and partially defining the first chamber, and a second piston head associated with and partially defining the second chamber, the piston rod arranged to abut and move with the first piston head in a first direction, the piston rod further arranged to abut and move with the second piston head in a second direction.

The actuator mechanically separates the functions of the actuator. The first chamber and second chamber are charged with gas. The gas within the first chamber and second chamber may act to hold the actuator in a biased position. The gas within the first chamber and/or second chamber may, if the actuator is moved out of the biased position, act on the piston rod in order to move the actuator back into the biased position. The intermediate chamber contains liquid, and acts to dampen any movement of the piston rod.

The first piston head or second piston head may comprise an aperture through which the piston rod passes. An end of the piston rod may be arranged to abut the first piston head or second piston head. The piston rod may comprise a shoulder located away from the end of the piston rod arranged to abut the first piston head or second piston head. The shoulder may be arranged to abut whichever of the first piston head or second piston head which is not abutted by the end of the piston rod. Such an arrangement may allow the piston rod to move with the first piston head in a first direction and move with the second piston head in a second direction. In a first instance, the piston rod may be driven by a force exerted on the piston rod by either the first piston head or second piston head. In a second instance, the piston rod may drive either the first piston head or second piston head by exerting a force on one of the said piston heads. The direction in which the piston rod moves when exerting a force on one of the first piston head or second piston head will be the opposite direction to the direction the piston rod moves when one of the first piston head or second piston head is exerting a force on the piston rod. The skilled person will appreciate that where appropriate, force is being used as a shorthand for net force acting on the actuator system.

The first chamber and/or second chamber may comprise a gas inlet port. The gas inlet port may be connected to a gas supply arranged to supply pressurised gas to the first chamber and/or second chamber.

The intermediate chamber may be in fluid communication with a reservoir containing liquid. The reservoir may supply or receive liquid from the intermediate chamber during operation of the actuator. The fluid in the intermediate chamber may act as a damper to movement of the piston rod through the intermediate chamber by applying a resistance to the first piston head and/or second piston head. External fluid control devices may act with the fluid in the intermediate chamber to provide a damping effect.

The first chamber and second chamber may be connected, for example by a gas transmission pipe, such that gas may pass between the first chamber and second chamber. In such an arrangement, there may be a gas inlet port connected with either one but not necessarily both of the first chamber and second chamber. The first chamber and second chamber may be arranged to act as a single unit, with a reduced extension stroke or compression stroke pressure within the system compared to the first chamber and second chamber acting independently.

The first chamber and/or second chamber may be associated with a gas pressure monitor. The intermediate chamber may be associated with a fluid level monitor. The first chamber and/or second chamber may be charged with nitrogen gas. The intermediate chamber may be filled with oil, for example an oil suitable for use in an aircraft hydraulics system.

According to a second aspect of the invention, there is also provided an aircraft landing gear pitch damper, the pitch damper comprising an actuator as described with reference to the first aspect of the invention.

According to a third aspect of the invention, there is also provided an aircraft landing gear, the aircraft landing gear comprising an aircraft landing gear pitch damper as described with reference to the second aspect of the invention.

According to a fourth aspect of the invention, there is provided an aircraft, the aircraft comprising an actuator as described with reference to the first aspect of the invention. The actuator may comprise a landing gear component. The landing gear component may be a pitch damper.

It will of course be appreciated that features described in relation to one aspect of the present invention may be incorporated into other aspects of the present invention. For example, the first aspect of the invention may incorporate any of the features described with reference to the second, third, or fourth aspects of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
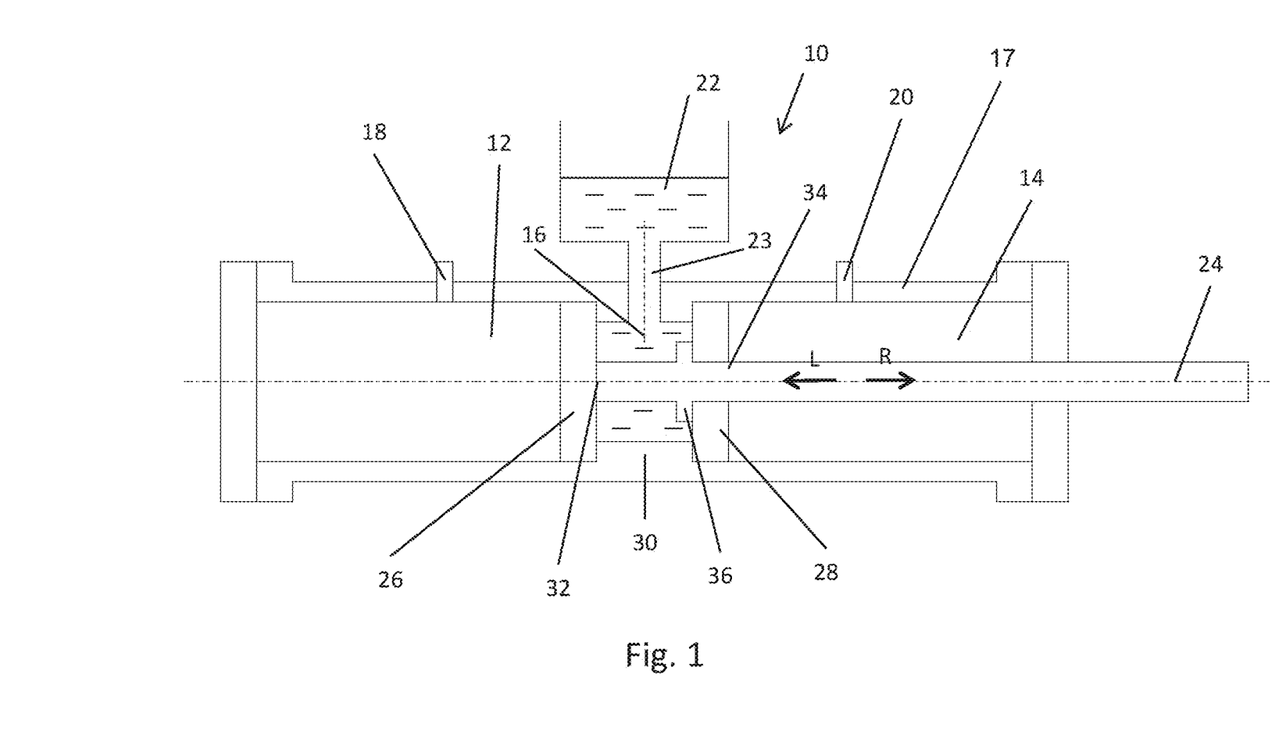
FIG. 1 shows a cross sectional view of an actuator according to a first embodiment of the invention in a central position.
Figure 2:
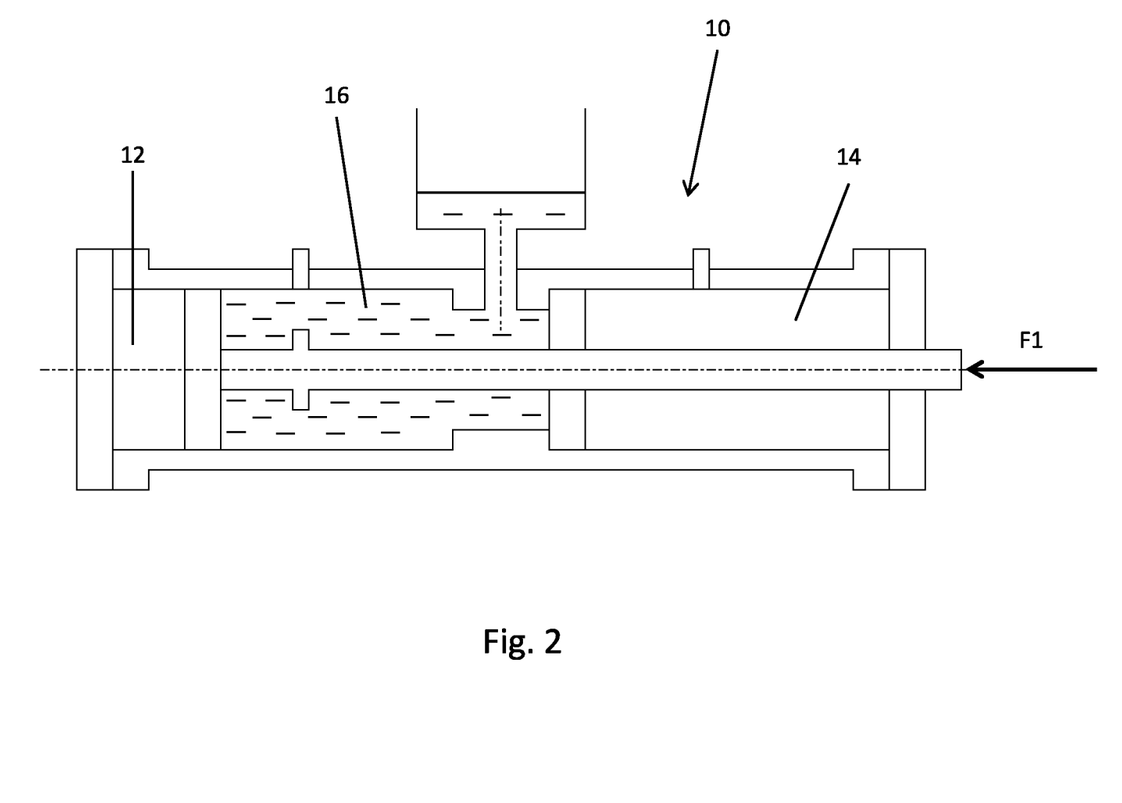
FIG. 2 shows the actuator of FIG. 1 at a first stroke end.

FIG. 1 shows an actuator 10 comprising a first chamber 12, a second chamber 14, and an intermediate chamber 16. The actuator includes a housing wall 17, and the first chamber 12, second chamber 14, and intermediate chamber 16 are bounded within the housing wall 17. The first chamber 12 and second chamber 14 are charged with gas through a respective first inlet port 18 and second inlet port 20. The intermediate chamber 16 is filled with liquid from a reservoir system 22. A fluid control device 23 may be located between the intermediate chamber 16 and the reservoir system 22. A piston rod 24 extends towards the first chamber 12 through the second chamber 14 and the intermediate chamber 16. A first piston head 26 is associated with and partially defines the first chamber 12, and a second piston head 28 is associated with and partially defines the second chamber 14. A shoulder 30 is located between the first chamber 12 and second chamber 14 and when the actuator is in the central position as shown in FIG. 1, the first piston head 26 and second piston head 28 abut opposite sides of the shoulder 30. The piston rod 24 abuts the first piston head 26 at an end 32 when the actuator 10 is in the central position. Movement of the piston rod in the direction indicated by the arrow L results in the end 32 pushing and moving the first piston head 26 such that the volume of the chamber 12 is reduced. To allow this movement, the piston rod 24 is arranged to pass through the second piston head 28 via an aperture 34 in the second piston head 28. FIG. 2 shows the actuator when a force F1 on the rod 24 has significantly compressed the volume of the first chamber 12. The volume of the second chamber 14 has remained the same, though it can be seen that the volume of the intermediate chamber 16 has increased by the same amount as the volume of the first chamber 12 has been reduced. The pressure within the first chamber 12 will increase as the volume is reduced, as will be well understood by a person skilled in the art. When the force on the piston rod 24 is removed, the pressure within the first chamber 12 will act to restore the piston rod 24 to the central position, as shown in FIG. 1. The liquid within the intermediate chamber 16 will act to damp this return movement and help prevent oscillations of the actuator 10 about the central point.

Figure 3:
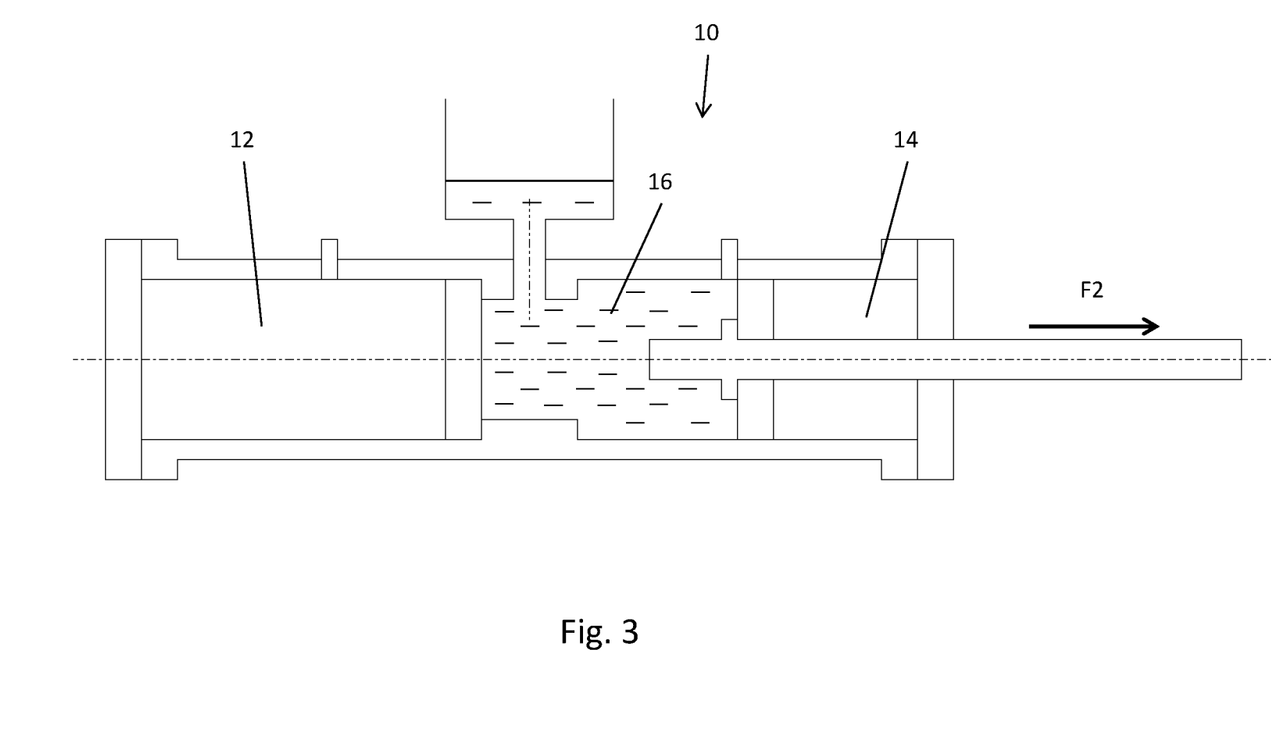
FIG. 3 shows the actuator of FIG. 1 at a second stroke end.

The piston rod 24 includes a shoulder 36 which acts to abut and drive the second piston head 28 when the piston rod 24 moves from the central position in the direction of the arrow R. The shoulder 36 is larger than the aperture 34 in order that the shoulder may engage with the second piston head 28 rather than passing straight through the aperture 34. FIG. 3 shows the actuator 10 when a force F2 on the piston rod 24 has significantly compressed the volume of the second chamber 14. The volume of the first chamber 12 remains the same, though it can be seen that the volume of the intermediate chamber 16 has increased by the same amount as the volume of the second chamber has been reduced. When the force on the piston rod 24 is removed, the pressure within the second chamber 14 will act to restore the actuator 10 to the central position as shown in FIG. 1. Again, the liquid in the intermediate chamber 16 will act to damp this return movement and help prevent oscillations of the actuator 10 about the central point.

The skilled person will appreciate the actuator comprises a number of seals arranged such that the liquid in the intermediate chamber 16 does not leak into the first chamber 12 and second chamber 14, and vice versa that the gas from the first chamber 12 and second chamber 14 does not leak into the intermediate chamber 16. These seals are not shown in the figures to improve the clarity of the representations.

Figure 4:
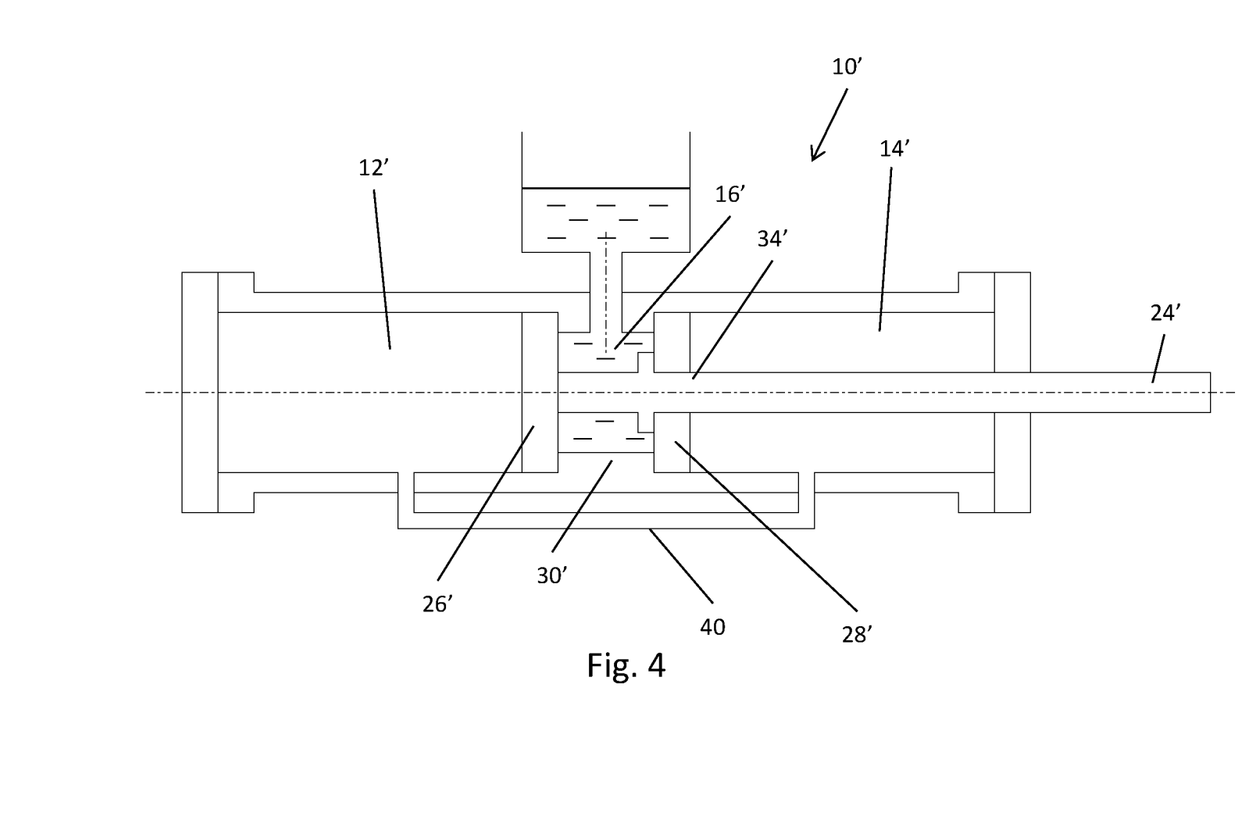
FIG. 4 shows a cross sectional view of an actuator according to a second embodiment of the invention.

FIG. 4 shows an actuator according to a second embodiment of the invention. The actuator 10' is of similar construction to that shown in FIGS. 1, 2, and 3, and like elements, such as the first chamber 12', the second chamber 14', and intermediate chamber 16' have similar reference numerals. However, in contrast to the first described embodiment of the invention, the first chamber 12' is in fluid communication with the second chamber 14' via a tube 40. During movement of the piston rod 24' gas will initially be compressed in one chamber and transferred via the tube 40 to the other chamber, in which the volume is increased. This transfer of gas between the chambers means that the pressure created within the chamber of reduced volume is less than if no gas transfer occurs. When the piston rod moves in the opposite direction and reduces the volume of the other chamber, gas moves the other way. A reduced pressure is then created in the newly compressed chamber as compared to when no gas transfer takes place.

In such an arrangement, the pressure increase within the first chamber 12' and 14' is less than in the first described embodiment. As the pressure within the actuator is reduced, the strength of the chamber walls may be reduced, along with a resultant reduction in weight of the actuator.

Figure 5:
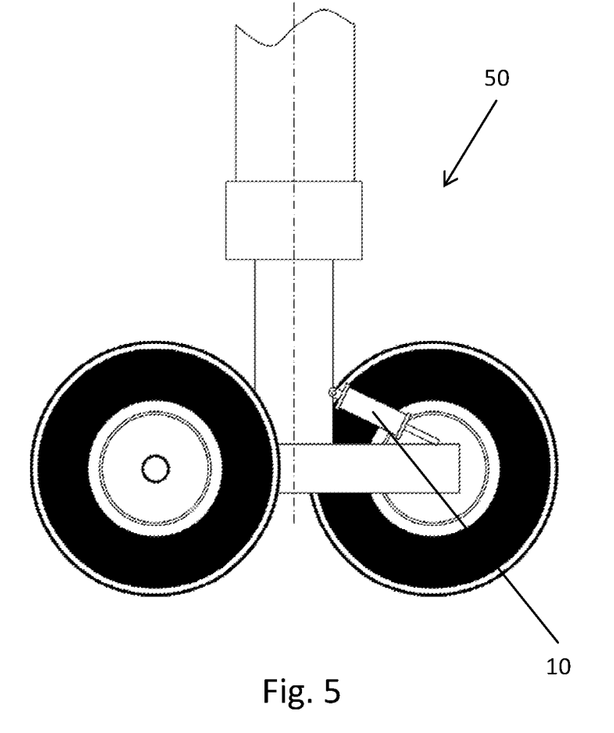
FIG. 5 shows an aircraft landing gear including a pitch damper actuator according to a third embodiment of the invention.

FIG. 5 shows an aircraft landing gear 50 comprising a pitch damper corresponding to a third embodiment of the invention.

Figure 6:
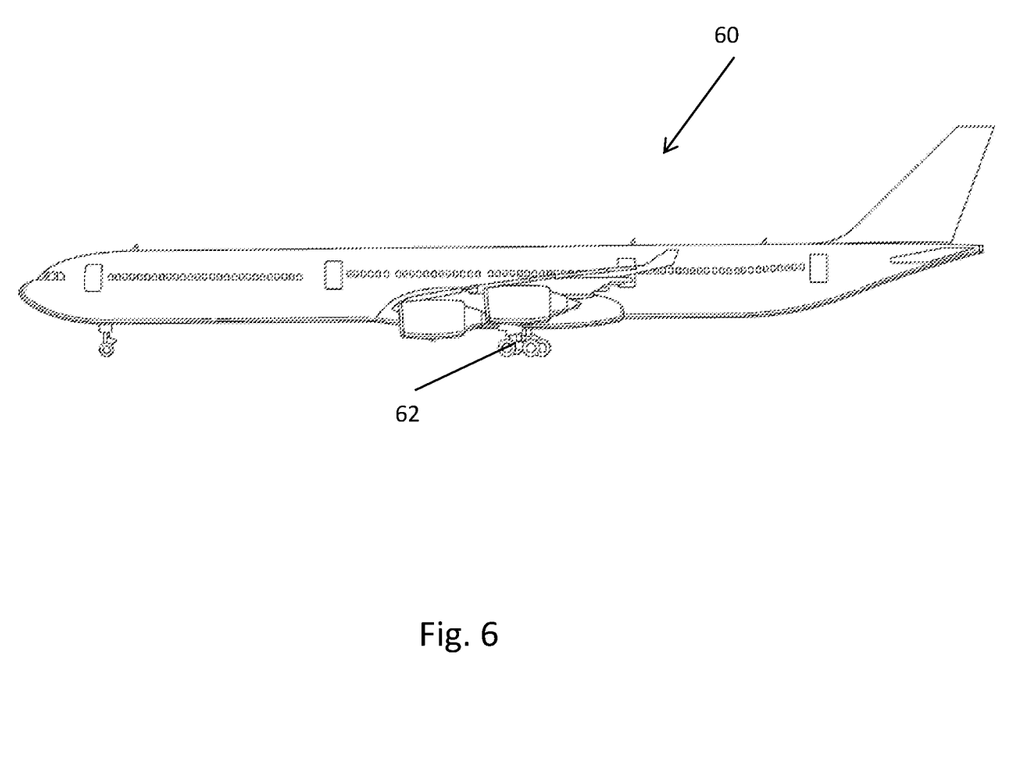
FIG. 6 shows an aircraft, the aircraft comprising a landing gear including an actuator according to a fourth embodiment of the invention.

FIG. 6 shows an aircraft 60 comprising a landing gear 62 including an actuator corresponding to a fourth embodiment of the invention.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

Moreover, it is to be understood that such optional integers or features, whilst of possible benefit in some embodiments of the invention, may not be desirable, and may therefore be absent, in other embodiments.

The invention claimed is:

1. An actuator comprising:
    a housing wall, a first chamber charged with gas, a second chamber charged with gas, and an intermediate chamber containing liquid, the intermediate chamber located between the first chamber and second chamber, wherein the first, second, and intermediate chambers are bounded within the housing wall,
    a piston rod extending towards the first chamber through the second chamber and intermediate chamber, a first piston head associated with and partially defining the first chamber, and a second piston head associated with and partially defining the second chamber, the piston rod arranged to abut and move with the first piston head in a first direction, the piston rod further arranged to abut and move with the second piston head in a second direction,
    wherein each of the first chamber and the second chamber are fluidically sealed relative to the intermediate chamber.

2. An actuator as claimed in claim 1, wherein the piston rod may be driven in either the first or second direction, the first and second direction being opposite to each other.

3. An actuator as claimed in claim 1, wherein the liquid within the intermediate chamber acts to dampen any movement of the piston rod.

4. An actuator as claimed in claim 1, wherein the second piston head comprises an aperture through which the piston rod passes.

5. An actuator as claimed in claim 1, wherein an end of the piston rod is arranged to abut the first piston head.

6. An actuator as claimed in claim 1, wherein the piston rod comprises a shoulder located away from an end of the piston rod arranged to abut the second piston head.

7. An actuator as claimed in claim 1, wherein the first chamber or second chamber comprises a gas inlet port.

8. An actuator as claimed in claim 7, wherein the gas inlet port is connected to a gas supply arranged to supply pressurised gas to the first chamber or second chamber.

9. An actuator as claimed in claim 1, wherein the intermediate chamber is in fluid communication with a reservoir containing the liquid.

10. An actuator as claimed in claim 1, wherein the first chamber and second chamber are connected, such that gas may pass between the first chamber and second chamber.

11. An actuator as claimed in claim 10, comprising a gas inlet port connected with either one but not both of the first chamber and second chamber.

12. An actuator as claimed in claim 1, wherein the first chamber and/or second chamber is associated with a gas pressure monitor.

13. An actuator as claimed in claim 1, wherein the intermediate chamber is associated with a fluid level monitor.

14. An aircraft landing gear pitch damper, the pitch damper comprising an actuator as claimed in claim 1.

15. An aircraft landing gear, the aircraft landing gear comprising an aircraft landing gear pitch damper as claimed in claim 14.

16. An aircraft, the aircraft comprising an actuator as claimed in claim 1.

17. An actuator, comprising:
    a housing wall;
    a first chamber charged with gas;
    a second chamber charged with gas;
    an intermediate chamber containing liquid, the intermediate chamber located between the first chamber and second chamber;
    wherein the first, second, and intermediate chambers are bounded within the housing wall;
    a piston rod extending towards the first chamber through the second chamber and intermediate chamber;
    a first piston head associated with and partially defining the first chamber, and a second piston head associated with and partially defining the second chamber, the piston rod arranged to abut and move with the first piston head in a first direction, the piston rod further arranged to abut and move with the second piston head in a second direction;
    wherein the second piston head comprises an aperture through which the piston rod passes;
    wherein an end of the piston rod is arranged to abut the first piston head; and,
    wherein the piston rod comprises only a single shoulder located away from the end of the piston rod arranged to abut the second piston head.

* * * * *